Aug. 28, 1934.   J. P. QUAM   1,971,657
JUICE EXTRACTOR
Filed April 13, 1932   2 Sheets-Sheet 1
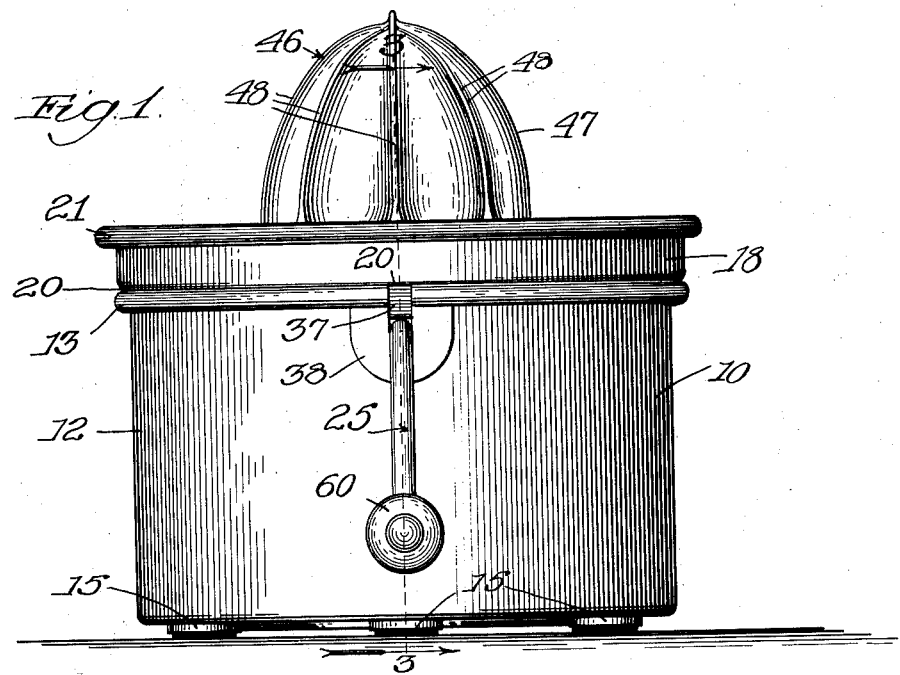
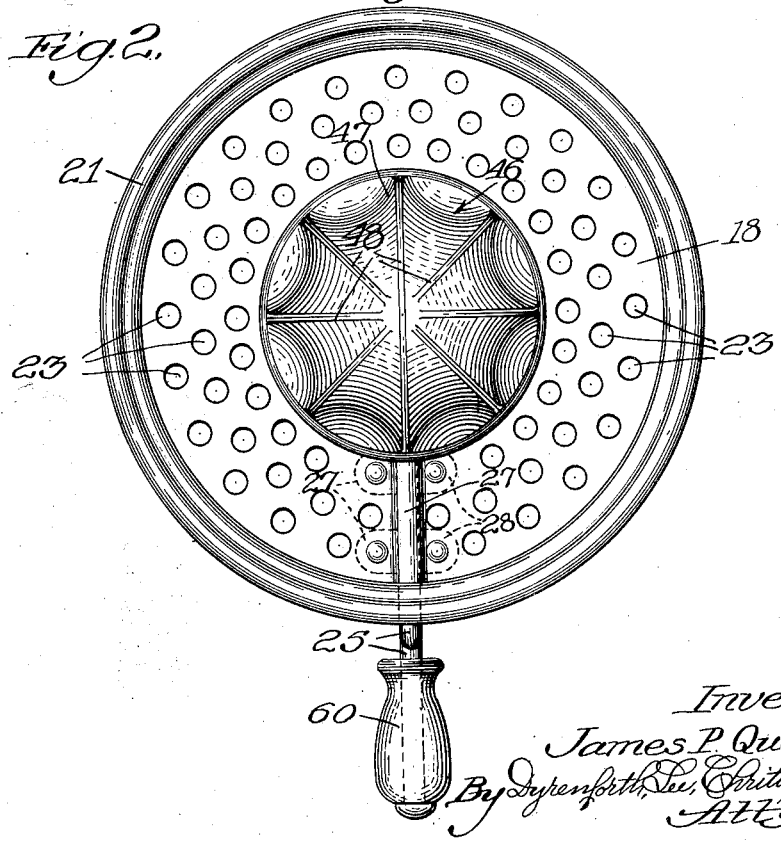
Inventor:
James P. Quam,
By Dyrenforth, Lee, Chritton & Wiles,
Att'ys Aug. 28, 1934.   J. P. QUAM   1,971,657
JUICE EXTRACTOR
Filed April 13, 1932    2 Sheets-Sheet 2
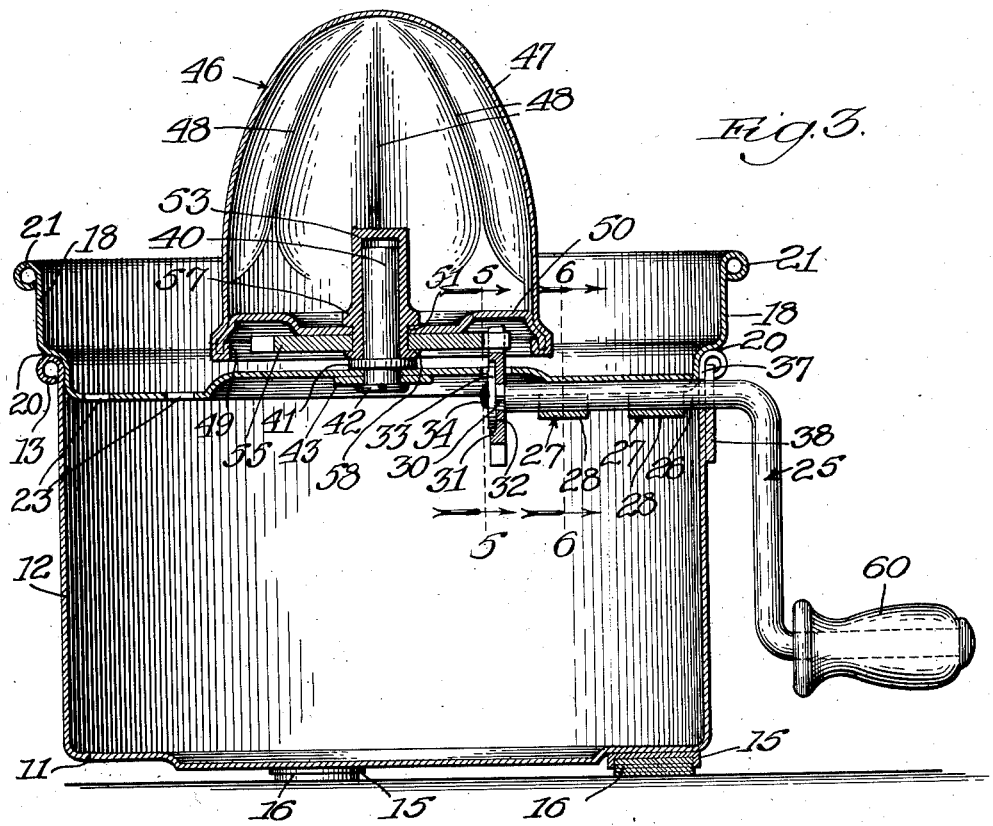
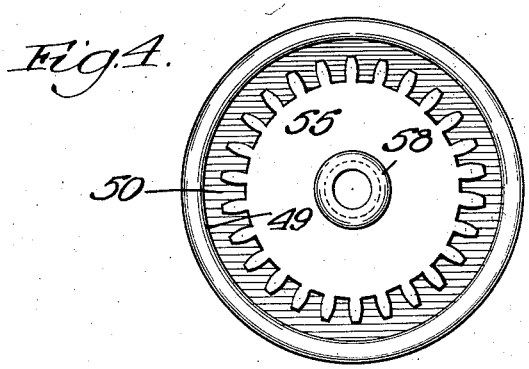
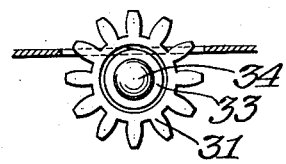
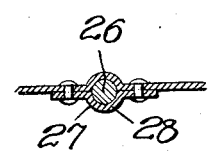
Inventor:
James P. Quam, Patented Aug. 28, 1934

1,971,657

UNITED STATES PATENT OFFICE 1,971,657

JUICE EXTRACTOR

James P. Quam, Chicago, Ill.

Application April 13, 1932, Serial No. 605,049

4 Claims. (Cl. 146—3)

The invention relates to juice extractors and particularly to devices for extracting the juice from lemons, oranges, etc.

A primary object of the invention is to provide a juice extractor of the character described which is neat and attractive in appearance, compact, durable, efficient and is relatively inexpensive.

One form of the invention is embodied in a juice extractor which comprises a container adapted to be placed upon a table top, or the like, a perforate dish adapted to telescope into the open top of the container, gearing carried by said dish, and a reamer-like member removably mounted on a shaft driven by said gearing.

The several parts are perferably formed from metal stampings which are easily assembled. The result is a juice extractor which is simple in construction and may be cleaned with very little effort.

Other objects and advantages will become apparent as the following detailed description progresses, reference being had to the accompanying drawings, wherein Fig. 1 is a side elevation of a juice extractor which embodies the invention.

Fig. 2 is a plan view of the improved juice extractor.

Fig. 3 is a section taken on line 3—3 of Fig. 1.

Fig. 4 is a bottom plan view of a reamer-like member which forms part of the improved device.

Fig. 5 is a section taken on line 5—5 of Fig. 3, and

Fig. 6 is a section taken on line 6—6 of Fig. 3.

Referring to the drawings wherein a preferred embodiment of the invention is illustrated, the reference character 10 designates a container which is preferably formed of sheet metal and comprises a bottom wall 11 and a cylindrical side wall 12. At its upper end, the side wall 12 is provided with an integral bead 13. Secured to the bottom surface of the bottom wall 11 are a plurality of metallic cup shaped members 15 in which discs 16 are held, the discs 16 being adapted to support the improved device upon a table top, or the like. The discs 16 are preferably formed from a mixture of rubber and fabric. The rubber serves to hold the device in place on dry surfaces while the fabric tends to hold the device in place on moist surfaces.

Removably seated in the open top of the container 10 is a dished member 18 which is preferably formed of sheet metal. The lower end of the dished member 18 is of a reduced diameter so that it telescopes into the open top of the container 10. An annular shoulder 20 formed in the dished member 18 is adapted to rest upon the bead 13. (See Fig. 3). The upper edge of the dished member 18 is preferably formed into a bead 21. The bottom wall of the dished member 18 is provided with a plurality of apertures 23 through which fruit juice may drain into the container 10. A crank arm which is designated generally by the reference character 25 has a shaft-like portion 26 journaled in bearings 27 formed by the bottom wall of the dished member 18 and bent bars 28 riveted to that wall. (See Figs. 3 and 6). The inner end of the shaft-like member 26 is squared as at 30 to receive a gear 31 which is constrained to rotate with the member 26. It will be noted that the gear 31 is provided with a recess 32 which accommodates a washer 33 mounted on the shaft-like member 26, the end of the member 26 being riveted over as at 34 to secure the gear 31 permanently to the member 26.

The container 10 is provided with a slot 37 which receives the shaft-like member 26 when the dished member 18 is assembled with the container. The cylindrical wall 12 is reenforced at the slot 37 by a metal stamping 38 which is soldered thereto.

A vertically disposed pin 40 is rigidly secured to the bottom wall of the dished member 18, the pin 40 being provided with an annular flange 41 which abuts against the upper surface of this bottom wall. The lower end of the pin 40 is riveted over as at 42 to clamp the bottom wall of the dished member 18 between the flange 41 and a washer 43 mounted on the pin.

A reamer-like member 46 is removably mounted on the pin 40. The reamer-like member 46 comprises a hollow member 47 which is preferably formed from sheet metal and is provided with a plurality of edges 48 on its outer surface. The bottom edge of the hollow member 47 is provided with an inwardly extending flange 49 which secures a disc 50 to the hollow member 47. The disc 50 is preferably stamped from sheet metal and is provided with a central aperture 51 which accommodates a tubular member 53 adapted to receive the pin 40 when the reamer-like member 46 is assembled with the dished member 18. Abutting against the under surface of the disc 50 is a gear 55 which is carried by the tubular member 53 and meshes with the gear 31. The disc 50 and the gear 55 are clamped between an annular flange 57, formed on the tubular member, and the lower end of the tubular member which is riveted over as at 58.

The outer end of the crank arm 25 is preferably provided with a handle member 60.

It will be readily understood that if the improved device is assembled in the manner illustrated in Fig. 3 and the crank arm 25 is rotated to drive the gear 31, gear 31 will drive the gear 55 and it, in turn, will drive the tubular member 53 and the hollow member 47. Then, if one-half of an orange or a lemon is pressed down over the hollow member 47, the juice will be extracted therefrom and will flow down over the outer surface of the hollow member 47 and drop into the dished member 18 to drop through the apertures 23 into the container 10. It is understood, of course, that the edges 48 provided upon the hollow member assist in extracting the juice from the orange or lemon. After sufficient juice has been collected in the container 10, the dished member 18 and the parts carried thereby may be removed from the container so that the fruit juice may be poured into any suitable receptacle.

While I have shown and described certain embodiments of my invention, it is to be understood that it is capable of many modifications. Changes, therefore in the construction and arrangement may be made without departing from the spirit and scope of the invention as disclosed in the appended claims, in which it is my intention to claim all novelty inherent in my invention as broadly as possible, in view of the prior art.

I claim:

1. A fruit juice extractor comprising a container, a dished member removably mounted on the container, a crank arm journaled on said dished member, a gear driven by said crank arm, a pin secured to said dished member, a reamer-like member removably mounted on said pin, and a second gear secured to said reamer-like member and adapted to mesh with the first mentioned gear.

2. A fruit juice extractor comprising a container, a dished member removably mounted on the container, said dished member having apertures through which juice may flow into said container, a pin secured to said dished member, a tubular member removably mounted on said pin, a metallic disc secured to said tubular member, a hollow member secured to said disc and adapted to extract juice from fruit, a gear secured to said tubular member and means carried by said dished member for driving said gear.

3. A fruit juice extractor comprising a sheet metal container which is open at its top and is provided with a slot in its upper edge, a dished member formed from sheet metal and mounted on said container, said dished member being provided with apertures through which fruit juice may flow into said container, a crank member journaled on said dished member and extending through said slot, a gear driven by said crank member, a pin secured to said dished member, a reamer-like member removably mounted on said pin, and a second gear constrained to rotate with said reamer-like member and adapted to mesh with the first mentioned gear.

4. A fruit juice extractor comprising a container, a dished member removably mounted on the container, said dished member having apertures through which juice may flow into said container, a pin secured to said dished member, a tubular member removably mounted on said pin, a metal disc secured to said tubular member, a hollow member secured to said disc and adapted to extract juice from fruit, a gear secured to said tubular member, a second gear meshing the first mentioned gear, and a crank arm journaled on said dished member, said second gear being fixed to said crank arm.

JAMES P. QUAM.